Figure 1:
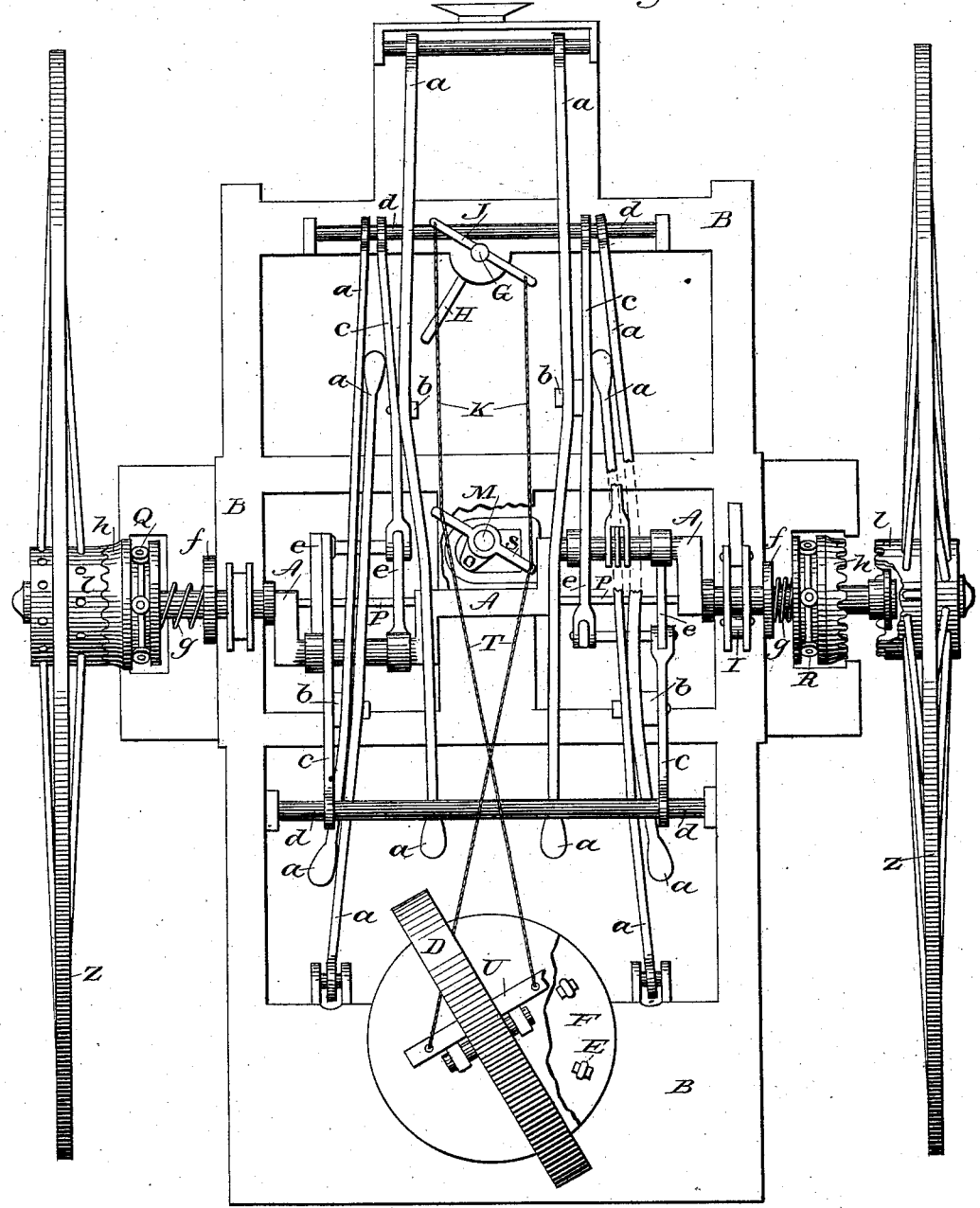

(Model.)

3 Sheets—Sheet 1.

J. CARDONA.
VELOCIPEDE.

No. 302,098. Patented July 15, 1884.

Witnesses:
W. E. Coolies
A. M. Best

Inventor:
Joseph Cardona
By Cohn & Thacher
Attorneys

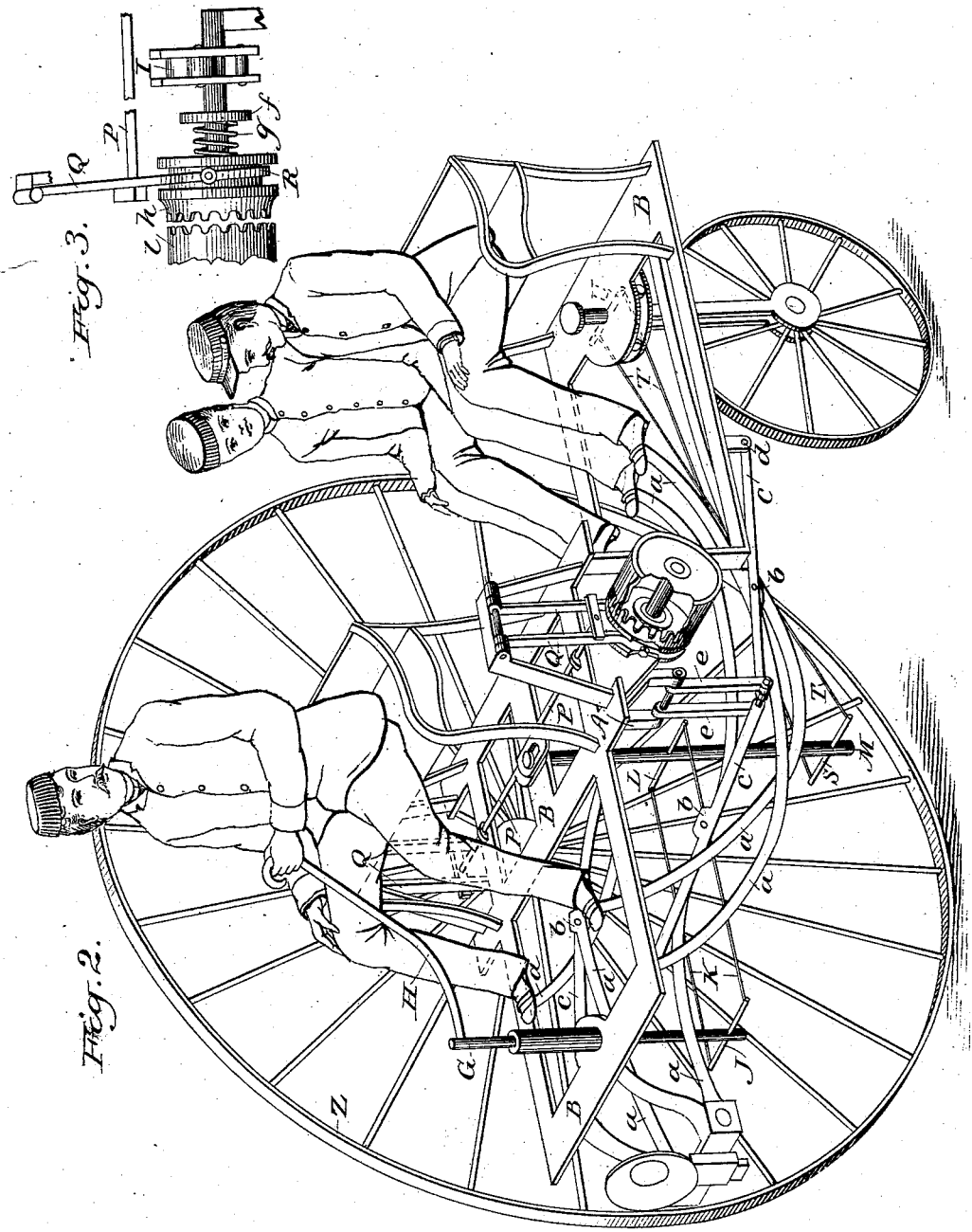

(Model.)
3 Sheets—Sheet 3.
J. CARDONA.
VELOCIPEDE.
No. 302,098. Patented July 15, 1884.
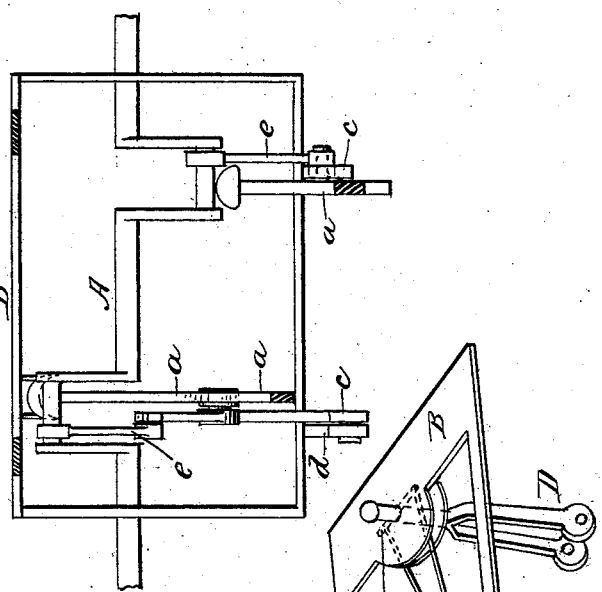
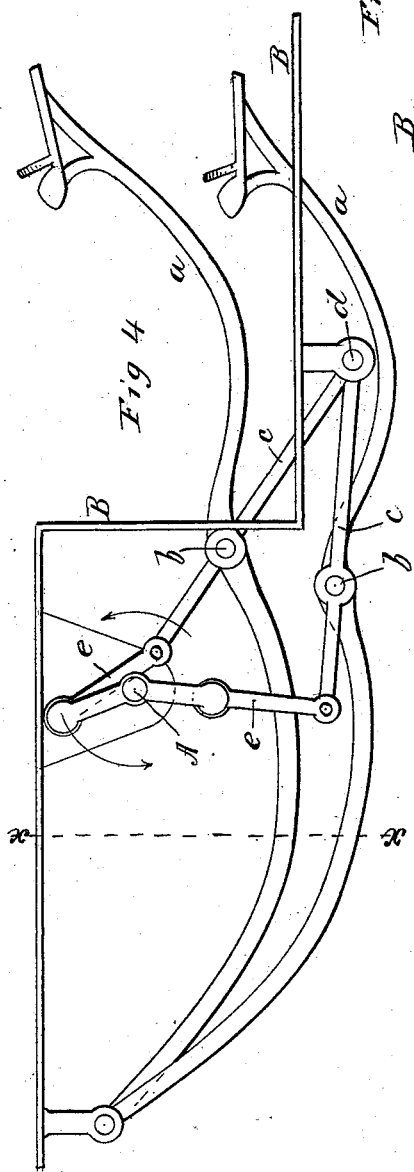
Witnesses
Levi Bacon
W. B. Chaffee
Inventor
Joseph Cardona
By Coburn & Thacher
Attorneys
N. PETERS. Photo-Lithographer. Washington, D. C.

UNITED STATES PATENT OFFICE.

JOSEPH CARDONA, OF CHICAGO, ILLINOIS.

VELOCIPEDE.

SPECIFICATION forming part of Letters Patent No. 302,098, dated July 15, 1884.

Application filed July 21, 1881. (Model.)

*To all whom it may concern:*

Be it known that I, JOSEPH CARDONA, a citizen of the United States, residing at Chicago, in the county of Cook and State of Illinois, have invented a new and useful Improvement in Velocipedes, of which the following is a full and accurate description, reference being had to the accompanying drawings, in which—

Figure 1 shows a top or plan view; Fig. 2, a perspective view with one wheel of the velocipede removed; Fig. 3, a detached view of one end of the axle and clutch which engages with the hub of the wheel, and a detached portion of the hub with the rod P, which operates the clutch; Fig. 4, a detached view of a portion of the main frame, showing one set of pedal-levers and their attachments; Fig. 5, a cross-section taken at the line $x$ $x$, Fig. 4; Fig. 6, a perspective view of the main frame and steering apparatus with the wheels and pedals removed.

My invention relates to that class of wheeled vehicles which is intended to be operated by foot-power and guided by the operator, and is adapted to have one or more sets of treadles by which it may be propelled.

My invention consists in the combination of the treadles with the operating part of the velocipede or vehicle; also, in the combination of mechanisms whereby one of the driving-wheels of the velocipede or vehicle is thrown out of gear and at the same time the steering-wheel turned, so as to guide the vehicle, as specified, also in other mechanisms and combinations thereof, hereinafter fully set forth and described.

In the accompanying drawings, B is the main frame of the velocipede or vehicle. Z are the drive-wheels by which it is propelled. $a$ are the pedal-levers by which the power is communicated to the double-crank axle A. This double-crank axle A passes through the hubs of the drive-wheels Z, and also is the main support of the frame B of the vehicle. The pedals are pivoted at one end to the frame B, and have also a pivoted fulcrum-connection, $b$, to the pivoted lever $c$. The pivoted levers $c$ are pivoted at one end to the frame B at $d$, while the other end is attached to the double-crank axle by means of the swinging or connecting rod $e$. One pedal of each pair of pedals that are used is connected to each crank of the double-crank axle A, so that when the operator presses down with his foot upon one of the pedals he vibrates the lever $c$, pressing down the end that is connected with the crank of the double-crank axle. This raises the other crank, so that when he presses down upon the other pedal its vibrating lever $c$ is pressed down and supplies its power by pulling its crank down and at the same time raising the other lever. By this combination of pedals and pivoted levers I get a double leverage upon the axle from each pedal, and I can apply two or more pairs of pedals to the double-crank axle, as shown in the drawings.

G is a vertical shaft, placed in the front end of the frame B. H is a handle or lever by which it is turned by the hand of the operator.

J is a cross-rod rigidly attached to the shaft G at its bottom. K are connecting-rods connecting this cross-rod J to the cross-rod L in the vertical shaft M, that is attached to the frame B at its center. S is also a cross-rod rigidly attached to the vertical shaft M, and T are rods connecting this cross-rod S to a cross-rod, U, in the shaft of the small rear wheel, D, on which the rear part of the frame B of the vehicle is supported. The rods T cross each other for the purposes hereinafter specified. By means of these connecting rods and shafts the operator, by turning the shaft G, turns the guide-wheel D one way or the other, as he desires.

O is a cam on the top or upper end of the shaft M.

P are connecting rods or levers which are operated by the cam O to slide back and forth on the frame B. These rods P are connected with the cam and clutch shifting strap Q, the forks of which are suspended from a pin and run loose in the clutch-groove R. By means of this cam O, attached or secured to the shaft M, one of the rods P is operated when the shaft M is turned, and the clutch $h$ is disengaged from the hub $l$ of its driving-wheel, so that the wheel is left to turn loosely on its axle, while the other driving-wheel remains in gear. At the same time the guide-wheel D is turned so that the loose wheel will run around the wheel that is not disengaged from its clutch, and the vehicle turned around by the operator, one of its driving-wheels substantially acting as a pivot on which it turns.

When the vehicle is turned as far as the operator desires to turn it, he moves the lever H and turns the shaft M, so that the rod P is released, when the spring g, that is placed on the axle behind the clutch h and between it and the shoulder f, which is attached to the axle, throws the clutch back into gear with the hub of the wheel Z, and at the same time turns the guide-wheel D into line with the direction of the carriage. The frame B has a bearing upon the double-crank axle A by resting upon the anti-friction rollers or wheels I, and the back or rear of said frame B is supported upon the small pivot or guide wheel D through the means of the anti-friction wheels E, which have a bearing on the disk or plate F. These anti-friction wheels, which support the frame both upon the crank-axle and upon the disk of the pivot or guide wheel D, are for the purpose of relieving the friction between the frame and these operating parts.

It will be observed that I am able to run my velocipede by means of one pair of treadles, or by means of two pairs or more, and the operator, while operating one set of treadles, is able to throw one of the drive-wheels out of gear, so as to leave it loose upon the axle, and at the same time turn the guide-wheel so as to turn the vehicle or velocipede.

Having thus fully described the construction and operation of my invention, what I claim as new, and desire to secure by Letters Patent, is—

1. The combination of the treadles a, pivoted lever c, swinging connecting-rods e, and crank-axle A, substantially as specified and shown.

2. The combination of the shaft G and shaft M, connecting-rods K, the cam O, rods P, and clutch h, whereby the operator is able to throw the clutch back from contact with the wheel-hub, substantially as specified and shown.

3. The combination of the shaft G, shaft H, the guide-wheel D, and their connecting-rods, whereby the operator is enabled to guide the vehicle, substantially as specified and shown.

4. The combination of the shaft G, shaft M, the clutches h, guide-wheels D, and their connecting-rods, operating substantially as specified and shown, to throw each one of the drive-wheels out of gear and turn the vehicle by the same operation, substantially as specified and shown.

JOSEPH CARDONA.

Witnesses:
HENRY BROWN,
AUGUST SCHMIDT.